United States Patent

Chen et al.

(10) Patent No.: US 8,714,527 B2
(45) Date of Patent: May 6, 2014

(54) DECELERATION DEVICE

(75) Inventors: Wen-Sheng Chen, Shenzhen (CN); Zhi-Ming Zhao, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 662 days.

(21) Appl. No.: 12/844,993

(22) Filed: Jul. 28, 2010

(65) Prior Publication Data

US 2011/0290049 A1 Dec. 1, 2011

(30) Foreign Application Priority Data

May 31, 2010 (CN) .......................... 2010 1 0186888

(51) Int. Cl.
*B66D 3/00* (2006.01)

(52) U.S. Cl.
USPC .......................... 254/383; 74/89.2; 188/65.2

(58) Field of Classification Search
USPC ........ 74/89.2, 89.21, 89.22; 254/383; 901/19, 901/23, 28; 188/65.1, 65.2
See application file for complete search history.

(56) References Cited

U.S. PATENT DOCUMENTS

| | | | | |
|---|---|---|---|---|
| 5,149,057 A | * | 9/1992 | Meurer | 254/276 |
| 5,207,114 A | * | 5/1993 | Salisbury et al. | 74/479.01 |
| 5,388,480 A | * | 2/1995 | Townsend | 74/501.5 R |
| 5,562,556 A | * | 10/1996 | Carson | 474/62 |
| 5,813,282 A | * | 9/1998 | Azuma | 74/89.22 |
| 6,006,853 A | * | 12/1999 | Shimizu et al. | 180/444 |
| 6,925,927 B2 | * | 8/2005 | Peck | 92/137 |
| 7,421,988 B2 | * | 9/2008 | Battlogg | 123/90.16 |
| 8,596,159 B2 | * | 12/2013 | Zhang et al. | 74/490.01 |
| 8,601,898 B2 | * | 12/2013 | Zhao et al. | 74/490.01 |
| 2006/0231812 A1 | * | 10/2006 | Ziech et al. | 254/278 |
| 2008/0196555 A1 | * | 8/2008 | Yoon | 81/57.11 |
| 2009/0320638 A1 | * | 12/2009 | Lee et al. | 74/490.04 |
| 2010/0043296 A1 | * | 2/2010 | Oxley | 49/360 |
| 2010/0051767 A1 | * | 3/2010 | Erel et al. | 248/205.1 |
| 2011/0233007 A1 | * | 9/2011 | Zhao et al. | 188/65.1 |
| 2011/0290049 A1 | * | 12/2011 | Chen et al. | 74/89.2 |

FOREIGN PATENT DOCUMENTS

| | | |
|---|---|---|
| CN | 1643272 A | 7/2005 |
| CN | 200959029 Y | 10/2007 |
| CN | 201296802 Y | 8/2009 |

* cited by examiner

*Primary Examiner* — Troy Chambers
*Assistant Examiner* — Alexander Vu
(74) *Attorney, Agent, or Firm* — Novak Druce Connolly Bove + Quigg LLP

(57) ABSTRACT

A deceleration device includes a driving device and a transmission assembly. The transmission assembly includes a driving member, a first active subassembly, a second active subassembly, a first transmission member, a second transmission member and two regulatory mechanisms. The driving member is connected to the driving device. The first transmission member connects the driving member to the first active subassembly, and is driven by the driving device, and rotates the first active subassembly. The second transmission member connects the first active subassembly to the second active subassembly, and is driven by the first active subassembly, and rotates the second active subassembly. The two regulatory mechanisms elastically resist the first transmission member and the second transmission member, respectively.

20 Claims, 5 Drawing Sheets

United States Patent US 8,714,527 B2

DECELERATION DEVICE

BACKGROUND

1. Technical Field

The present disclosure generally relates to robotics and, particularly, to a deceleration device used in a robot.

2. Description of the Related Art

Deceleration devices are widely used in industrial robotics and other applications. A deceleration device often includes a plurality of meshing gears of different diameters.

A commonly used deceleration device includes an inner gear arranged in a shell, a crankshaft with an eccentrically rotating portion arranged in the shell, and a cycloidal gear sleeved on the eccentrically rotating portion. The cycloidal gear rotates about the eccentrically rotating portion, and not only meshes with the inner gears but also, at the same time, performs a revolution, thereby generating an output speed lower than the input rotating speed. However, to achieve higher meshing degree and steadier output, the cycloidal gear generally has a plurality of gear teeth on its outer surface. When the deceleration device is of a reduced size, if too many gear teeth are formed on the cycloidal gear, each gear tooth becomes very small, with the clearance between adjacent gear teeth also becoming very small. Thus, overlapping interference between the roots of the adjacent gear teeth may be resulted. Therefore, the cycloidal gear and the gear teeth are difficult to manufacture, and higher cost and more complicated structure are thereby presented.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
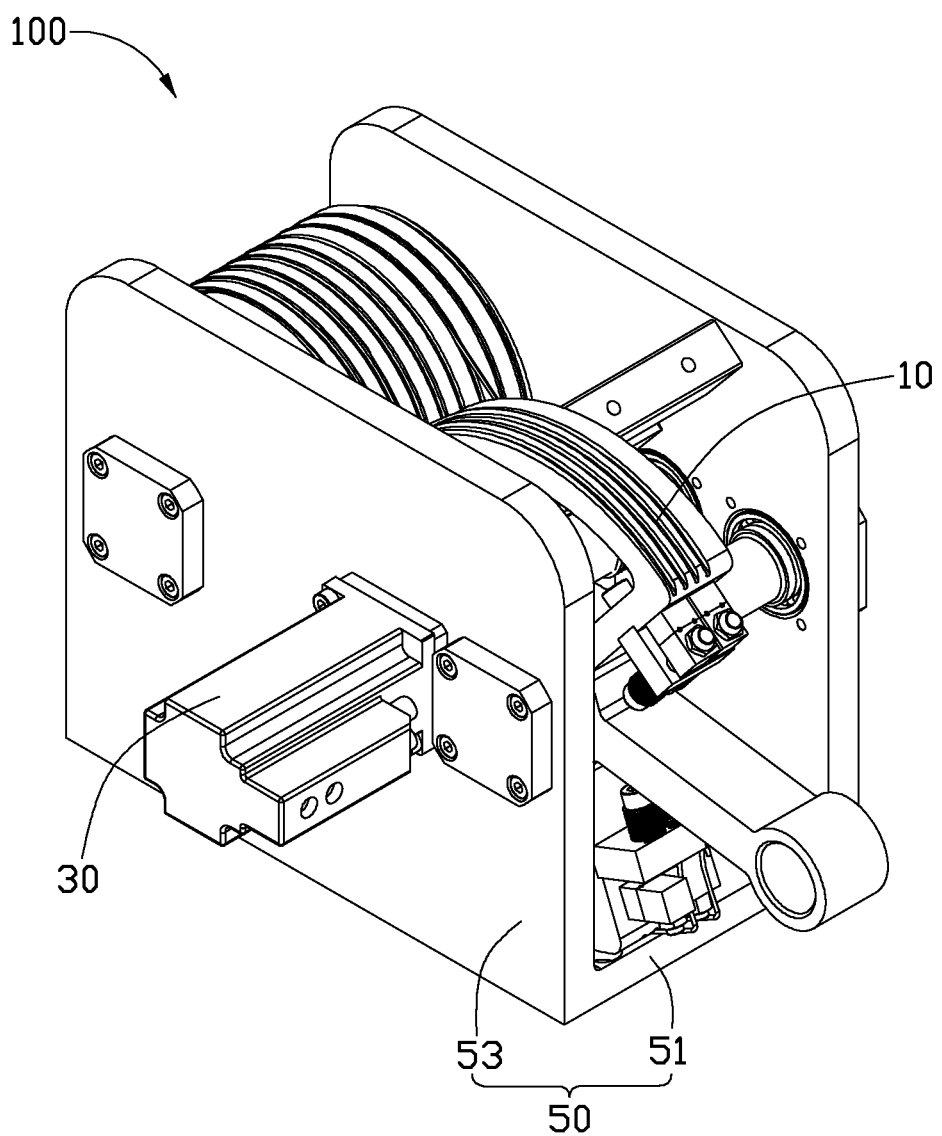
FIG. 1 is an assembled, isometric view of a deceleration device as disclosed, including a driving device and a transmission assembly.

Referring to FIG. 1, a deceleration device 100 used in a robot includes a transmission assembly 10, a driving device 30 to drive the transmission assembly 10, and a bracket 50 to support the transmission assembly 10.

Figure 2:
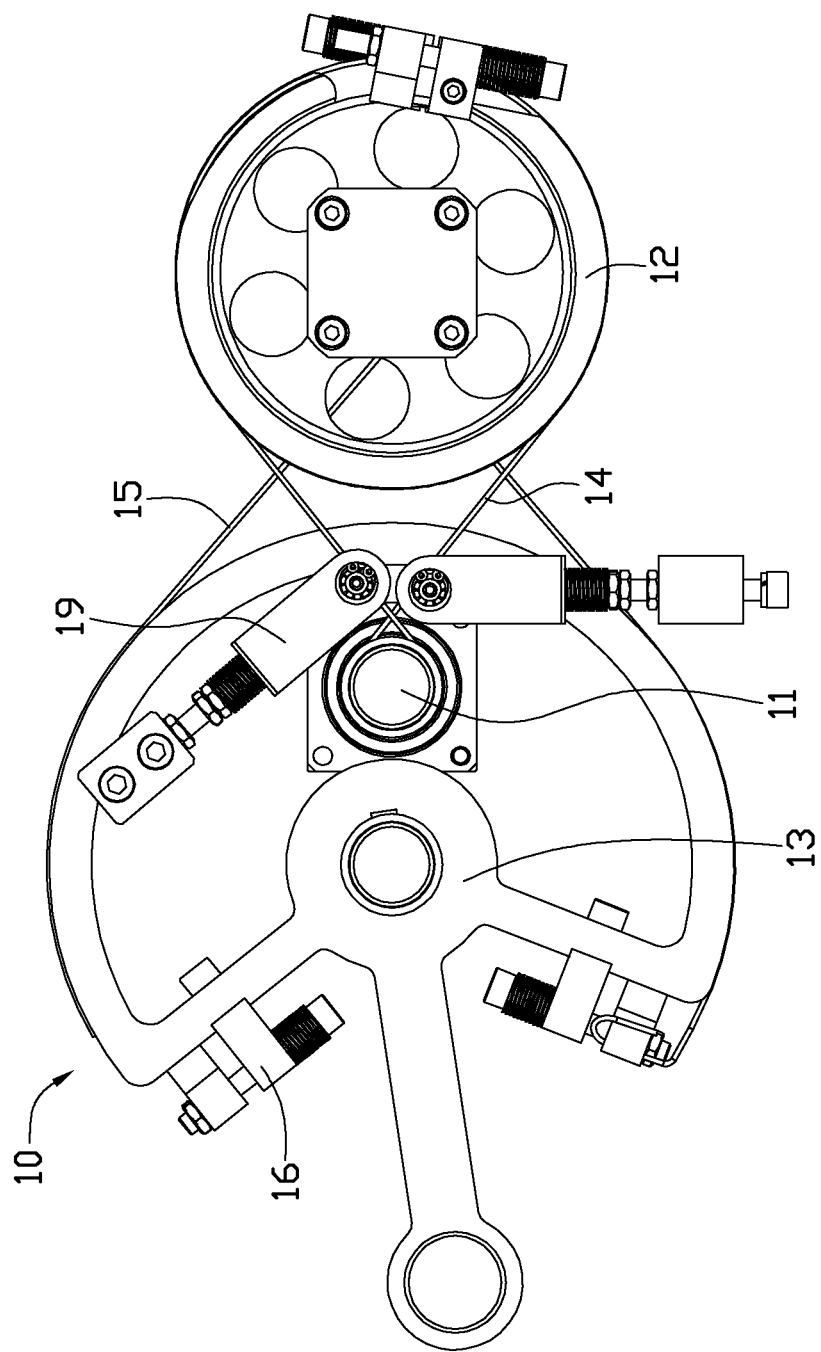
FIG. 2 is an assembled, isometric view of the transmission assembly of FIG. 1.

Referring to FIG. 2, the transmission assembly 10 includes a driving member 11, a first active subassembly 12, a second active subassembly 13, a first transmission member 14, a second transmission member 15, four fixing subassemblies 16 and two regulatory mechanisms 19. The driving member 11 of a cylindrical shape is connected to the driving device 30. The first transmission member 14 coils around the driving member 11 and the first active subassembly 12. The second transmission member 15 coils around the first active subassembly 12 and the second active subassembly 13. One pair of the fixing subassemblies 16 fixedly connect the ends of the first transmission member 14 to the first active subassembly 12, and the other pair of the fixing subassemblies 16 fixedly connect the ends of the second transmission member 15 to the second active subassembly 13. The two regulatory mechanisms 19 are fixed on the bracket 50, and elastically resist the first transmission member 14 and the second transmission member 15, respectively.

Figure 3:
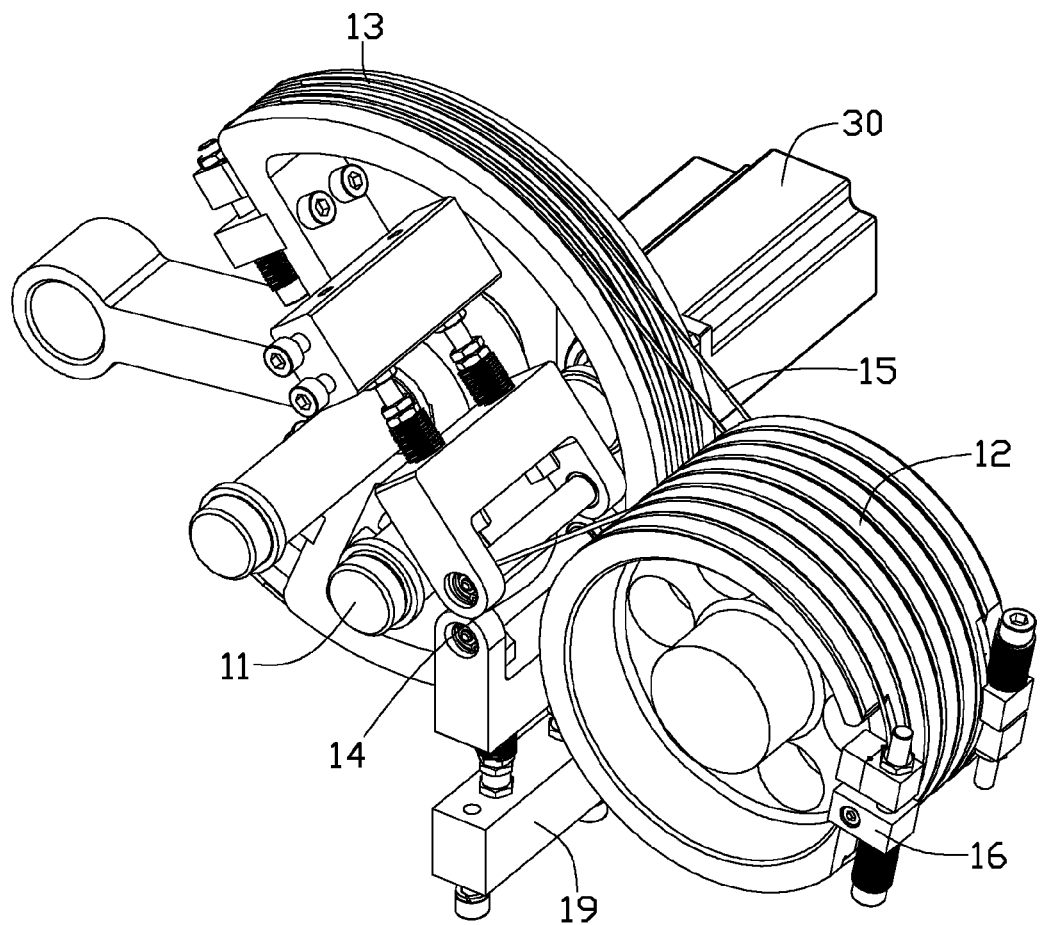
FIG. 3 is a partially assembled, isometric view of the deceleration device of FIG. 1 from another aspect.
Figure 4:
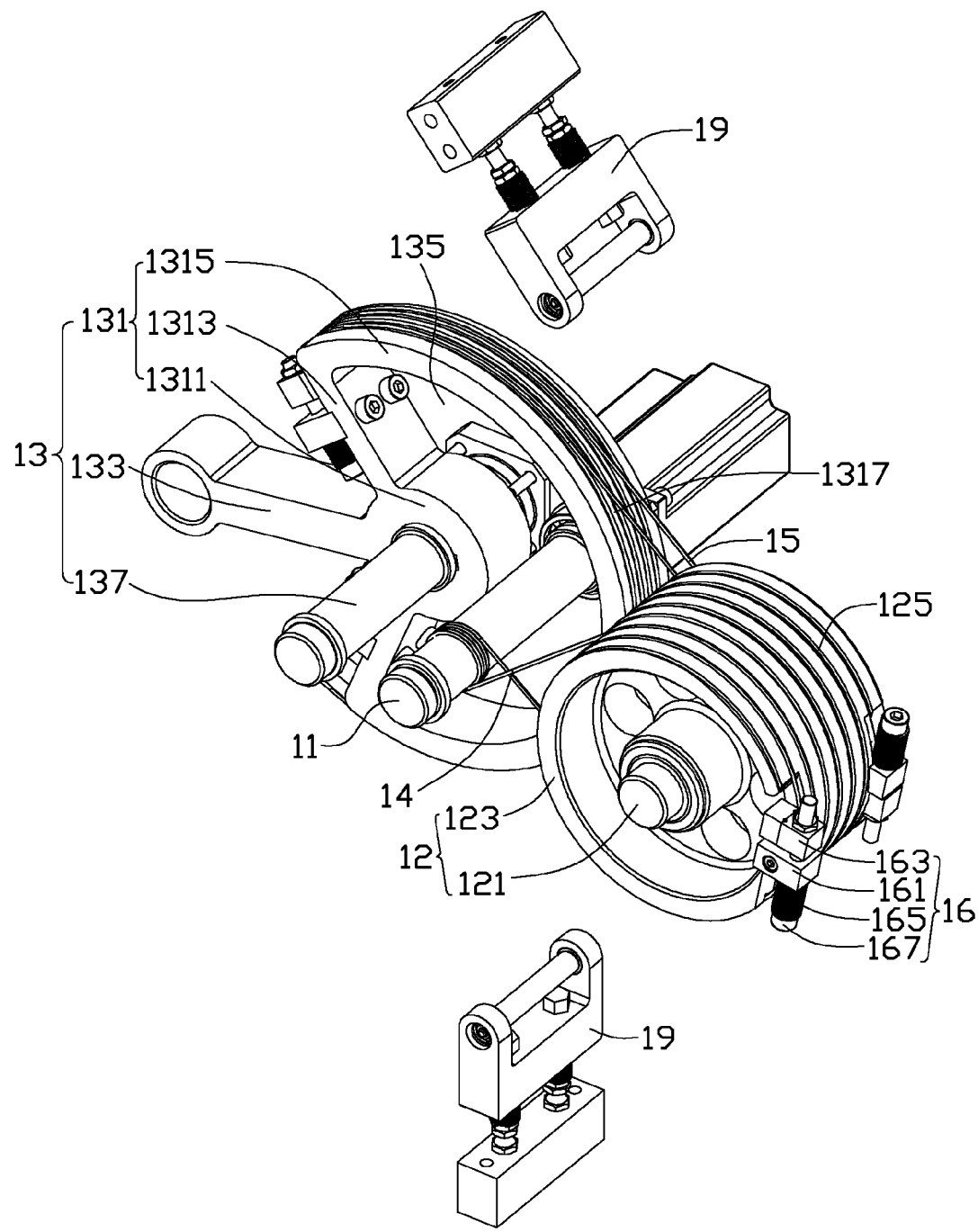
FIG. 4 is a partially disassembled, isometric view of the deceleration device of FIG. 1.

Referring to FIGS. 3 and 4, the first active subassembly 12 includes an active shaft 121 and a active wheel 123 arranged around the active shaft 121 at opposite sides thereof. The active wheel 123 defines a spiral receiving slot 125 in an outer surface of the active wheel 123, and the spiral receiving slot 125 has a plurality of windings. The ratio of the diameter of the active wheel 123 to the diameter of the driving member 11 is called a first stage transmission ratio of the deceleration device 100.

The second active subassembly 13 includes a transmission portion 131, a transmission rod 133 extending from one end of the transmission portion 131, and a rotating shaft 137. The second active subassembly 13 further defines a through hole 135. The transmission portion 131 is substantially fan-shaped, and includes a connecting end 1311, two sidewalls 1313 extending from the connecting end 1311, respectively, and a curved edge 1315 connecting the ends of the sidewalls 1313, respectively. The curved edge 1315 defines four receiving slots 1317, which are substantially parallel, in the illustrated embodiment. The transmission rod 133 extends away from the curved edge 1315 at the connecting end 1311. The through hole 135 is defined between the curved edge 1315 and the sidewalls 1313. The rotating shaft 137 extends through the connecting end 1311, and is substantially perpendicular to the transmission rod 133. The ratio of the radius of the fan-shaped transmission portion 131 to the radius of the active shaft 121 of the first active subassembly 12 is called a second stage transmission ratio of the deceleration device 100. The fan angle of the fan-shaped transmission portion 131 of the second active subassembly 13 equals the product of 360° and the ratio of the rotating windings of the first active subassembly 12 and the second stage transmission ratio.

The first transmission member 14 coils around the driving member 11 and the receiving slot 125 of the active wheel 123. The receiving slot 125 of the active wheel 123, which is receiving the first transmission member 14, carries fewer windings than the receiving slot 125 has remaining. The first transmission member 14 may be a wire cable, a steel bar, or other material of sufficient strength. In the illustrated embodiment, the first transmission member 14 is a wire cable, providing higher transmission precision, better rigidity and steady transmission.

The second transmission member 15 coils around the active shaft 121 of the first active subassembly 12 and the receiving slot 1317 of the second active subassembly 13. The second transmission member 15 may be a wire cable, a steel bar, or other material of sufficient strength. There may further be any number of additional second transmission members 15, thereby additionally influencing the strength thereof. In the illustrated embodiment, two second transmission members 15 are deployed, and are of wire cables, for providing higher transmission precision, better rigidity and steady transmission.

Each fixing subassembly 16 includes a positioning member 161, a first adjustment member 163, a first resilient member 165 and a connecting rod 167, and a plurality of bolts (not shown). The first resilient member 165 includes a plurality of dish-shaped spacers.

Figure 5:
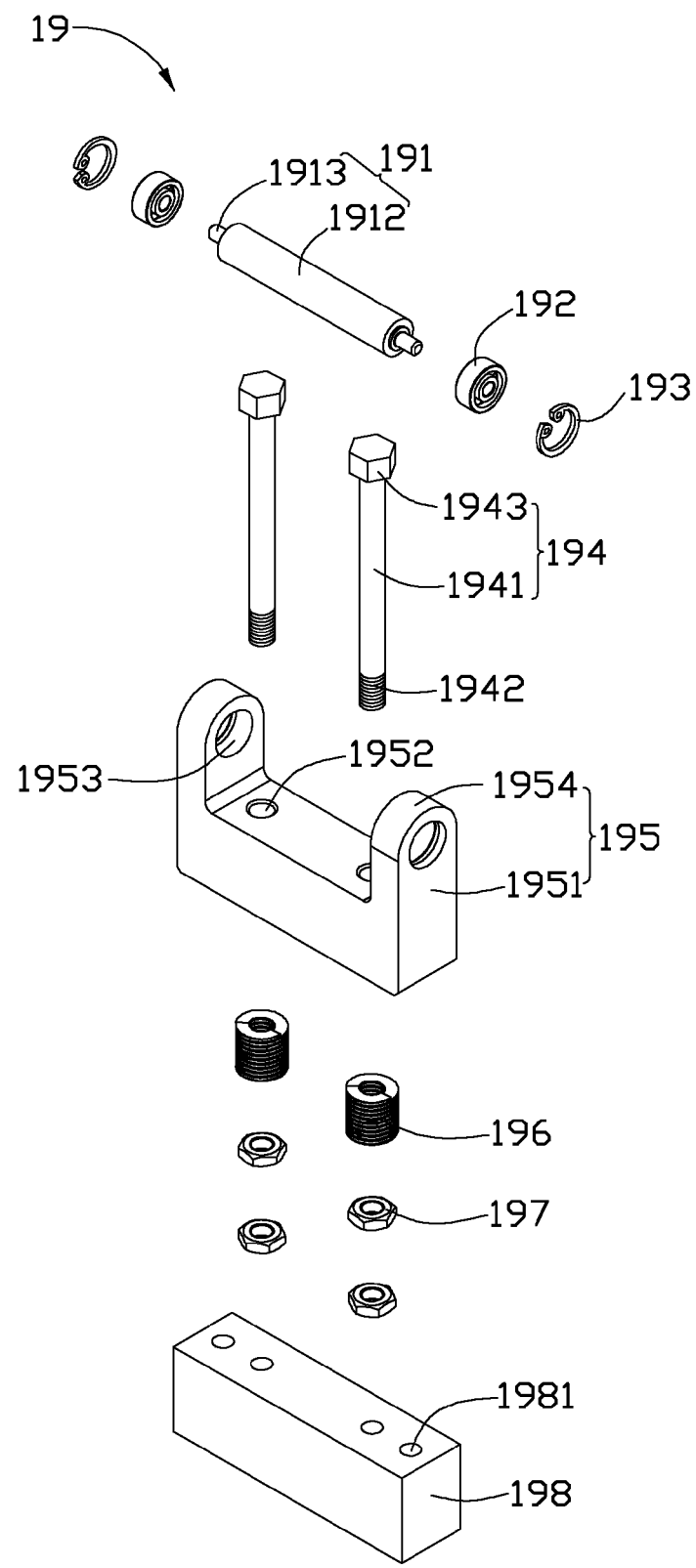
FIG. 5 is an exploded, isometric view of the transmission assembly of FIG. 1.

Referring to FIG. 5, each regulatory mechanism 19 includes a second adjustment member 191, two bearings 192, two resisting members 193, two guide members 194, a sliding bracket 195, two second resilient members 196, four fasteners 197 and a connecting member 198. The second adjustment member 191 resists the first transmission member 14 or the second transmission member 15. The sliding bracket 195 is rotatably connected to the second adjustment member 191. The two guide members 194 slidably pass through the sliding bracket 195. The two second resilient members 196 sleeve on the two guide members 194, respectively, and resist the sliding bracket 195. The four fasteners 197 fixedly sleeve on the two guide members 194, and resist the two second resilient members 196. The connecting member 198 is fixed to the two guide members 194.

The second adjustment member 191 includes a contacting portion 1912 and two rotary portions 1913. The contacting portion 1912 is substantially cylindrical. The two rotary portions 1913 are disposed on opposite ends of the contacting portion 1912. The two bearings 192 sleeve on the two rotary portions 1913, respectively. The resisting member 193 is substantially a loop with an opening, and contacts an outer side of the bearings 192.

The guide member 194 includes a rod portion 1941 and a blocking portion 1943 disposed on an end of the rod portion 1941. The rod portion 1941 includes a threaded portion 1942 arranged at an end of the rod portion 1941 away from the blocking portion 1943.

The sliding bracket 195 includes a main body 1951 and two connecting portions 1954. The main body 1951 defines two through holes 1952 on a side surface of the main body 1951 adjacent to the connecting portions 1954. The two connecting portions 1954 extend from opposite ends of a side surface of the main body 1951. Each connecting portion 1954 defines a receiving groove 1953 on a side surface of the corresponding connecting portion 1954. The corresponding bearings 192 and the corresponding resisting member 193 are held in one receiving groove 1953.

The two second resilient members 196 are a plurality of substantially cylindrical or rectangular springs. In the illustrated embodiment, the two second resilient members 196 are cylindrical springs. The four fasteners 197 are a plurality of nuts.

The connecting member 198 defines four threaded holes 1981. The two guide members 194 pass through the two threaded holes 1981, and the bolts pass through the other two threaded holes 1981, such that the connecting member 198 is fixed on the bracket 50.

The driving device 30 is a motor, which includes a main body (not labeled) and a rotating shaft (not labeled) rotatably connected to the main body.

The bracket 50 includes a base plate 51 and two side plates 53. The two side plates 53 extend substantially perpendicular to opposite edges of the base plate 51.

Referring to FIGS. 1 through 5, during assembly of the deceleration device 100, an end of the rotating shaft 137 of the second active subassembly 13 is rotatably received in one side plate 53 of the bracket 50. The main body of the driving device 30 is fixed to other side plate 53 of the bracket 50. The driving member 11 extends through the through hole 135 of the second active subassembly 13. One end of the driving member 11 extends through the side plate 53 and is rotatably connected to the rotating shaft of the driving device 30, the other end of the driving member 11 extends through another side plate 53 and is rotatably connected to the other side plate 53. Opposite ends of the first active subassembly 12 extend through the side plate 53, and are rotatably connected to the side plates 53. Rotational axis of the active shaft 121 of the first active subassembly 12 is substantially parallel to the rotational axis of the driving member 11. The first transmission member 14 forms a plurality of windings around the driving member 11, and each end of the first transmission member 14 coils around the active wheel 123 of the first active subassembly 12, respectively, and is extending into the receiving slots 125 of the active wheel 123. Opposite ends of the first transmission member 14 are connected to the active wheel 123 by two fixing subassemblies 16. One positioning member 161 of one fixing subassembly 16 is fixed on the active wheel 123 by a bolt. The connecting rod 167 extends through the first resilient member 165 and the first adjustment member 163, and fixedly connects to the positioning member 161. One end of the first transmission member 14 is received in the first adjustment member 163 and fixed by the bolt threading on the first adjustment member 163. The other fixing subassembly 16 fixes the other end of the second transmission member 15 to the active wheel 123 as described. The second transmission member 15 comprising a plurality of coils winding around the active shaft 121, and located the active wheel 123 of the first active subassembly 12. Opposite ends of the second transmission member 15 extend into the interval receiving slots 1317 of the second active subassembly 13 and are fixed on the sidewalls 1313 of the second active subassembly 13 by the fixing subassemblies 16, respectively. The guide members 194 of the two regulatory mechanisms 19 pass through the through holes 1952 of the sliding bracket 195, respectively. The two bearings 192 sleeve on the two rotary portions 1913 of the second adjustment member 191. The two resisting members 193 contact the outer side surface of the two bearings 192, and are held in the receiving grooves 1953 of the sliding bracket 195. The two second resilient members 196 sleeve on the two guide members 194 respectively. The four fasteners 197 sleeve on the two guide members 194, and are threaded on the threaded portions 1942 of the two guide members 194. The threaded portions 1942 of the two guide members 194 are threaded in the two threaded holes 1981 of the connecting member 198. The connecting member 198 of one regulatory mechanism 19 is fixedly connected to the base plate 51. The connecting member 198 of the other regulatory mechanism 19 is fixedly connected to one of the two side plates 53 of the bracket 50.

During operation of the deceleration device 100, the driving device 30 rotates the driving member 11; in the illustrated embodiment, the driving member 11 rotates in a positive direction, which is clockwise, for example. When the driving member 11 rotates in the positive direction, a portion of the first transmission member 14 coiled around the driving member 11 that is adjacent to the driving device 30 may be coiled into the receiving slot 125 of the active wheel 123 adjacent to the driving device 30. The first transmission member 14 rotates the first active subassembly 12 in a reverse direction to the positive direction; a portion of the second transmission member 15 coiled around the active shaft 121 of the first active subassembly 12 is coiled into one receiving slot 1317 of the second active subassembly 13, and another portion of the second transmission member 15 may be withdrawn from one adjacent receiving slot 1317, thus, driving the second active subassembly 13 to rotate in the positive direction. After the driving member 11 has rotated a number of default windings, the driving device 30 rotates the driving member 11 in a reverse direction to the positive direction, the first active subassembly 12 rotates in the positive direction, and the second active subassembly 13 rotates in a reverse direction to the positive direction. The second adjustment members 191 of the two regulatory mechanisms 19 can rotate itself, such that a frictional force caused by the friction between the first transmission member 14 and the second transmission member 15 is decreased. The sliding bracket 195 slides relative to the guide members 194, and resists the second resilient members 196, such that the second adjustment members 191 of the two regulatory mechanisms 19 flexibly resist the first transmission member 14 and the second transmission member 15.

The first transmission member 14 and the second transmission member 15 are wire cables, therefore, there is no need for having a gear set or other complicated structures in the deceleration device 100, thereby the manufacturing cost is lower. The first transmission member 14 coils on the driving member 11 and the first active subassembly 12. The second transmission member 15 coils on the first active subassembly 12 and the second active subassembly 13, increasing the friction between two contacting members thereof. Finally, the deceleration device 100 provides higher transmission precision, better rigidity and steady transmission. The first active subassembly 12 is not only an active component of the first stage transmission but also a driving component of the second stage transmission, thus simplifying the structure of the deceleration device 100. The through hole 135 of the second active subassembly 13 can receive a portion of the driving member 11, thereby providing the deceleration device 100 with more compact structure. In addition, the two regulatory mechanisms 19 flexibly resist the first transmission member 14 and the second transmission member 15 respectively, thus preventing the first transmission member 14 and the second transmission member 15 from loosening, such that a transmission accuracy of deceleration device 100 is improved.

The first and second transmission members 14, 15 are maintained under tension by means of the elastic force of the first resilient member 165. When the first and second transmission members 14, 15 loosen, the connecting rod 167 is adjusted to bias the first resilient member 165 such that the first and second transmission members 14, 15 regain tension.

It is to be understood that the regulatory mechanisms 19 can also be other structures, not being limited to that disclosed. For example, each regulatory mechanism can include a support rod and a wheel rotatably connected to an end of the support rod. The support rod is made of elastic materials. The wheel contacts the first and second transmission members 14, 15.

Finally, while the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure as defined by the appended claims.

What is claimed is:

1. A deceleration device, comprising:
    a driving device; and
    a transmission assembly, comprising:
        a driving member connected to the driving device; and
        a first active subassembly;
        a second active subassembly comprising a transmission portion, the transmission portion defining a through hole to receive the driving member;
        a first transmission member coiling around the driving member and the first active subassembly, and being driven by the driving device, and rotating the first active subassembly;
        a second transmission member coiling around the first active subassembly and the transmission portion, and being driven by the first active subassembly, and rotating the second active subassembly; and
        two regulatory mechanisms elastically resisting the first transmission member and the second transmission member, respectively,
    wherein the driving member is inserted into the through hole, an end of the driving member away from the driving device protrudes from the through hole, and the first transmission member coils around the end of the driving member that is away from the driving device.

2. The deceleration device of claim 1, wherein a rotational axis of the first active subassembly is substantially parallel to a rotational axis of the driving member.

3. The deceleration device of claim 2, wherein the first active subassembly comprises an active shaft and an active wheel arranged around the active shaft; wherein the first transmission member coils around the driving member, and the opposite ends of the first transmission member coil on the active wheel.

4. The deceleration device of claim 3, wherein the second transmission member coils around the active shaft of the first active subassembly, and the opposite ends of the second transmission member coil on the transmission portion.

5. The deceleration device of claim 4, wherein the transmission portion of the second active subassembly is substantially fan-shaped, and comprises a connecting end, two sidewalls respectively extending from the connecting end, and a curved edge connecting ends of the two sidewalls, the through hole is defined between the curved edge and the two sidewalls, the second transmission member coils around the curved edge of the transmission portion.

6. The deceleration device of claim 5, wherein the curved edge of the transmission portion defines a receiving slot receiving a portion of the second transmission member.

7. The deceleration device of claim 3, wherein the active wheel defines a receiving slot in which the first transmission member is coiled.

8. The deceleration device of claim 1, wherein the first transmission member and the second transmission member are wire cables.

9. The deceleration device of claim 1, wherein the first transmission member and the second transmission member are steel bars.

10. The deceleration device of claim 1, wherein the transmission assembly further comprises a plurality of fixing subassemblies fixing the first transmission member to the first active subassembly and the second transmission member to the second active subassembly.

11. The deceleration device of claim 1, wherein each regulatory mechanism comprises a second adjustment member resisting the first transmission member or the second transmission member, two bearings respectively sleeved on opposite ends of the second adjustment member, a sliding bracket rotatably connected to the opposite ends of the second adjustment member, and a guide member slidably passing through the sliding bracket, the sliding bracket comprises a main body and two connecting portions extending from opposite ends of the main body, each connecting portion defines a receiving groove, each of the two bearings is held in a corresponding receiving groove.

12. The deceleration device of claim 11, wherein each regulatory mechanism further comprises two second resilient members sleeving on the guide members, respectively, and resisting the main body of the sliding bracket.

13. A deceleration device, comprising:
    a driving device; and
    a transmission assembly, comprising:
        a driving member connected to the driving device;
        a first active subassembly;

a second active subassembly comprising a transmission portion, the transmission portion defining a through hole to receive the driving member;

a first transmission member coiling around the driving member and the first active subassembly;

a second transmission member coiling around the first active subassembly and the transmission portion of the second active subassembly; and two regulatory mechanisms elastically resisting the first transmission member and the second transmission member, respectively, wherein the driving device rotates the driving member, the driving member rotates the first active subassembly, and the first active subassembly rotates the second active subassembly, the driving member is inserted into the through hole and not touched with the transmission portion, an end of the driving member away from the driving device protrudes from the through hole, and the first transmission member coils around the end of the driving member that is away from the driving device.

14. The deceleration device of claim 13, wherein a rotational axis of the first active subassembly is substantially parallel to a rotational axis of the driving member.

15. The deceleration device of claim 14, wherein the first active subassembly comprises an active shaft and a wheel arranged around the active shaft; the first transmission member coils around the driving member, and the opposite ends of the first transmission member coil on the active wheel.

16. The deceleration device of claim 15, wherein the transmission portion comprises a connecting end, two sidewalls respectively extending from the connecting end, and a curved edge connecting ends of the two sidewalls, the through hole is defined between the curved edge and the two sidewalls, the second transmission member coils on the active shaft of the first active subassembly, and the opposite ends of the second transmission member coil on the curved edge of the transmission portion.

17. The deceleration device of claim 15, wherein the active wheel defines a receiving slot in which the first transmission member is coiled.

18. The deceleration device of claim 17, wherein each regulatory mechanism comprises a second adjustment member resisting the first transmission member and the second transmission member, two bearings respectively sleeved on opposite ends of the second adjustment member, a sliding bracket rotatably connected to the opposite ends of the second adjustment member, a guide member slidably passing through the sliding bracket, and two second resilient members respectively sleeved on the guide members and respectively resisting the sliding bracket, the sliding bracket comprises a main body and two connecting portions extending from opposite ends of the main body, each connecting portion defines a receiving groove, and each of the two bearings is held in a corresponding receiving groove.

19. The deceleration device of claim 18, further comprising a bracket, the bracket comprising a base plate and two side plates extending substantially perpendicular to opposite edges of the base plate, the second active subassembly further comprising a transmission rod extending away from the curved edge at the connecting end, and a rotating shaft extending through the connecting end, wherein the rotating shaft is rotatably received in one side plate of the bracket, and the driving device is fixed to the other one side plate of the bracket.

20. The deceleration device of claim 15, wherein the transmission assembly further comprises a fixing subassembly, the fixing subassembly comprises a positioning member fixed on the active wheel, a first adjusting member, a first resilient member, and a connecting rod extending through the first resilient member, the connecting rod is adjustable, the first active subassembly is fixed to the positioning member, an end of the first transmission member is fixed to the first adjusting member.

* * * * *